United States Patent [19]
Buri et al.

[11] Patent Number: 5,666,854
[45] Date of Patent: Sep. 16, 1997

[54] GEAR WHEEL SUPPORT

[75] Inventors: Gerhard Buri, Markdorf-Riedheim; Josef Bader, Friedrichshafen, both of Germany

[73] Assignee: ZF Friedrichshafen AG, Friedrichshafen, Germany

[21] Appl. No.: 545,854

[22] PCT Filed: May 11, 1994

[86] PCT No.: PCT/EP94/01520

§ 371 Date: Nov. 7, 1995

§ 102(e) Date: Nov. 7, 1995

[87] PCT Pub. No.: WO94/27066

PCT Pub. Date: Nov. 24, 1994

[30] Foreign Application Priority Data

May 14, 1993 [DE] Germany ............... 43 16 233.9

[51] Int. Cl.[6] .................................................. F16H 57/02
[52] U.S. Cl. .......................... 74/434; 74/439; 384/425; 384/901
[58] Field of Search ............... 74/434, 439; 384/420, 384/425, 901; 403/356, 359

[56] References Cited

U.S. PATENT DOCUMENTS

| | | | |
|---|---|---|---|
| 2,108,679 | 2/1938 | Kurti | 403/359 |
| 2,397,905 | 4/1946 | Acton et al. | 384/420 |
| 3,500,695 | 3/1970 | Keiser | 74/331 |
| 3,894,621 | 7/1975 | Quick | 403/359 |
| 5,179,866 | 1/1993 | Reynolds et al. | |

FOREIGN PATENT DOCUMENTS 0 390 368  10/1990  European Pat. Off. .

OTHER PUBLICATIONS

Revue Technique Diesel, Nr.12, 1984, Boulogne–B8llancourt Seite 65 'boite de vitesse Fuller' Figur "Arbre Secondaire".

*Primary Examiner*—Rodney H. Bonck
*Assistant Examiner*—Troy Grabow
*Attorney, Agent, or Firm*—Davis and Bujold

[57] ABSTRACT

A support for a gear wheel, used in a toothed gear change transmission having a shaft and a gear wheel, where the support provides both sufficient axial fixing and radial play between the gear wheel and the shaft, necessary to compensate for working loads. The support is used with a gear wheel having internal teeth with at least one discontinuity in the internal teeth and a groove extending into the internal teeth. The support has a first disc with external teeth and at least one mating discontinuity in the external teeth, whereby the internal and external teeth and the discontinuities, respectively, can coincide with one another. A locking mechanism locks the position of the first disc relative to the gear wheel. To prevent against axial movement of the first disc against the direction of insertion into the groove, the support also includes a securing device.

7 Claims, 4 Drawing Sheets

GEAR WHEEL SUPPORT

The invention concerns a support for a gear wheel, preferably for a gear wheel in a toothed gear change transmission.

BACKGROUND OF THE INVENTION

In gear change transmissions gear wheels are used which require an axial fixing but are freely movable radially. Especially in input gear wheels of such transmissions that are not engaged in the power flow, the fixing in an axial direction and the freedom in a radial direction can be needed for a working load compensation. The gear wheels can, in this case, be provided with a continuous internal profiling. The internal profile has, in general, a groove in which axial support devices are used.

Also known are gear wheel supports in the toothing of which grooves are provided in the shaft which allow rotation of a support disc, provided with an internal toothing, in said groove. Such supports have been disclosed, for instance, in European patent application 0 390 368. Here the supporting disc rotated in the groove in the shaft is held in the rotated position by a wedge.

The problem to be solved by the invention is to provide a support for a gear wheel which makes reliable axial fixing and radial play possible.

BRIEF DESCRIPTION OF THE DRAWINGS

An explanation of the invention is described with reference to the drawings. In the drawings.

DETAILED DESCRIPTION OF THE DRAWINGS

Figure 1A:
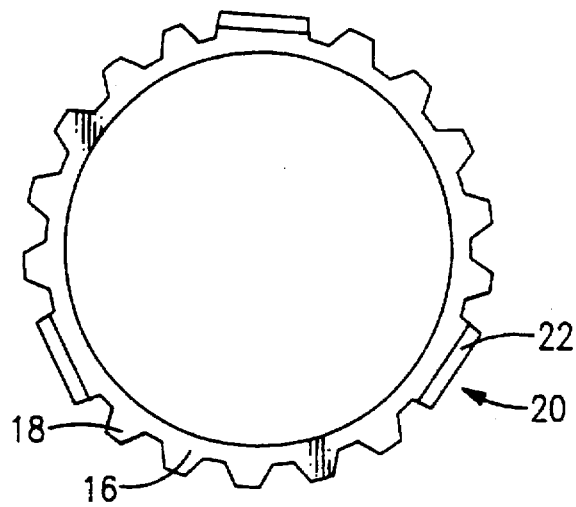
FIG. 1 is a representation of the component parts of the support according to the invention.
Figure 1B:
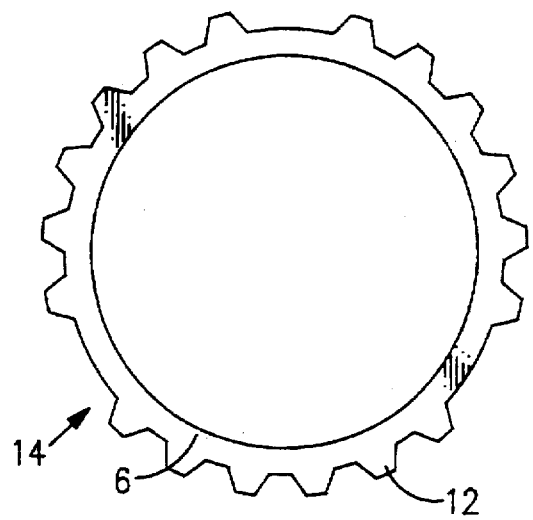
Figure 1C:
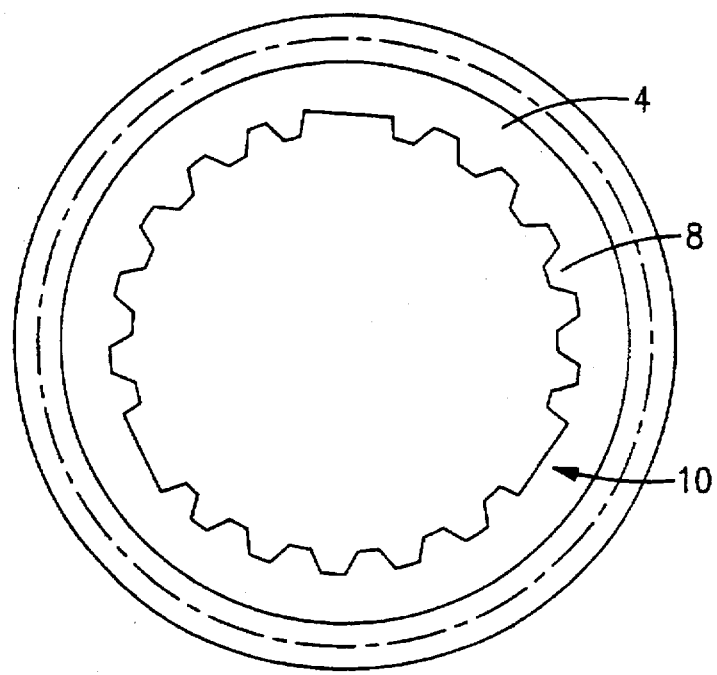

In FIG. 1, the component parts of the support are shown. FIG. 1A thus shows the locking disc, FIG. 1B the stop disc and FIG. 1C the gear wheel. It is proposed, according to the invention, to insert a first disc 6 in the continuous, internal profiling of a grooved gear wheel 4 as stop disc. The internal toothing 8 of the gear wheel 4 has a recess 10, in at least one area of its internal diameter, in which at least one tooth of the toothing is not provided. As shown in FIG. 1, preferably three of said recesses 10 are to be provided. The recesses 10 must be distributed on the periphery at respectively equal angles.

The first disc 6 has an external toothing 12 which corresponds to the internal toothing 8 of the gear wheel 4 and which also has on its external toothing at least one recess 14. Said recess 14 is designed so that at least one tooth of the external toothing 12 is not provided in this area. Three recesses 14 are also preferably to be provided here. The recesses 14 are distributed on the periphery of the stop disc 6 at equal angles.

The stop disc 6 is inserted in the gear wheel 4, in the internal toothing 8, up to the groove 30 and rotated in peripheral direction around at least part of one tooth gap until the teeth of the internal toothing 8 of the gear wheel 4 coincide with the teeth of the external toothing 12 of the stop disc 6. The insertion must be effected in such a manner that the recesses of the internal toothing 8 of the gear wheel 4 and the recesses 14 of the external toothing 12 of the stop disc 6 coincide. To fix the peripheral direction of the stop disc 6 relative to the gear wheel 4, and thus avoid a further rotation of the stop disc 6, a second disc is inserted as locking disc 16 likewise in the internal toothing 8 of the gear wheel 4. Said locking disc 16 has an external toothing 18 which likewise corresponds to the internal toothing 8 of the gear wheel 4.

Instead of teeth, at least a so-called "tab" or "knob" is provided as a locking device 22 on at least one area 20 of the external periphery which, relative to the plane of the locking disc 16, is bent almost to a right angle. Three such locking devices 22 are also preferably provided here. Said "tabs" or "knobs" 22 are distributed on the periphery of the locking disc 16 so as to be adjustable in the recesses 10, 14 of the internal toothing 8 of the gear wheel 4 and external toothing 12 of the stop disc 6.

If the "knobs" 22 of the locking disc 16 have found their place in the recesses 10, 14 of the stop disc 6 and the internal toothing 8 of the gear wheel, rotation of the stop disc 6 in the groove of the internal toothing 8 of the gear wheel 4 is no longer possible. The recess 14 of the stop disc 6 here can be designed so that over part of the depth thereof the tooth shape of the external toothing 12 remains and the locking device 22 of the locking disc 16 is designed so that said locking device extends only into the remaining part of the recess 14. The locking device 22 of the locking disc 16 likewise can be designed so that the bending relates only to part of the wall thickness of the locking disc 16 and in the remaining part the tooth shape of the external toothing 18 of the locking disc 16 is retained.

The external diameter of stop disc 6 and locking disc 16 is designed somewhat smaller than the internal diameter of the groove 30 in the gear wheel 4. Therefore, the radial play of the gear wheel 4 is maintained in the area of the groove 30. The stop disc 6 and locking disc 16 are freely rotatable on shaft 24.

At least one securing device, such as in the form of a guard ring fixed on the shaft, can be provided against an axial drifting of the locking disc 16 toward the shaft that supports the discs 6, 16 and the gear wheel 4.

Figure 2:
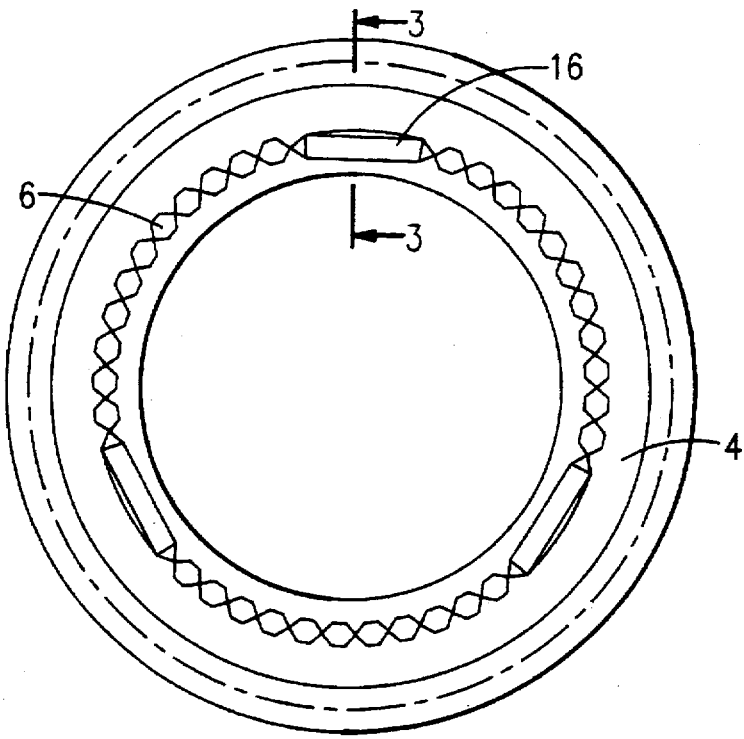
FIG. 2 is a representation of the assembled component parts.

FIG. 2 shows the three components gear wheel 4, stop disc 6 and locking disc 16 in an assembled state. It is to be understood here that the respective teeth of the internal toothing 8, the external toothing 12 and the external toothing 18 are superposed and coincide. Likewise the meshing of the locking devices 22 in the recesses 10, 14, 20 is to be seen.

Figure 3:
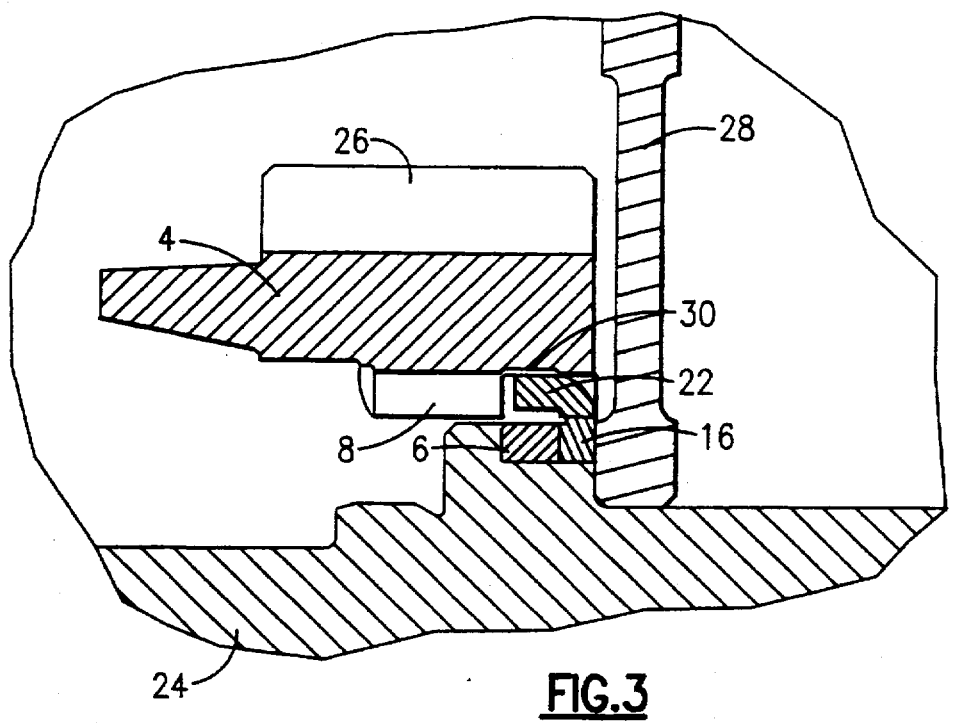
FIG. 3 is a partial longitudinal section corresponding to line 3—3 in FIG. 2 from a representation of the arrangement in a transmission.

FIG. 3 shows a section from an illustration of the support installed in a transmission. The gear wheel 4, with external toothing 26 and internal toothing 8 is situated upon a shaft 24. The locking device 22 of the locking disc 16 extends into the stop disc 6. The locking disc 16 is axially supported on the shaft 24 by a structural part 28 of the transmission not specifically designated here.

Figure 4A:
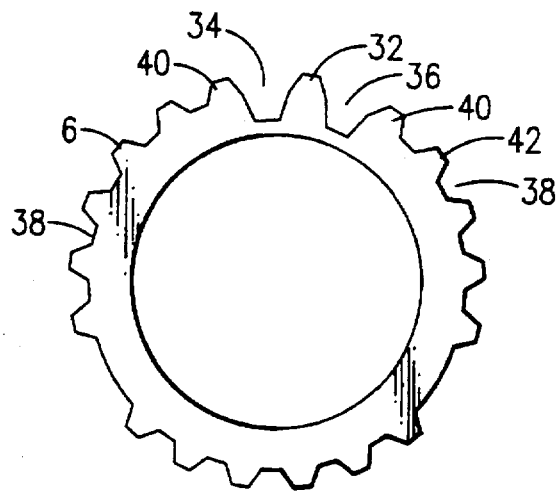
FIG. 4 is a modified stop disc.
Figure 4B:
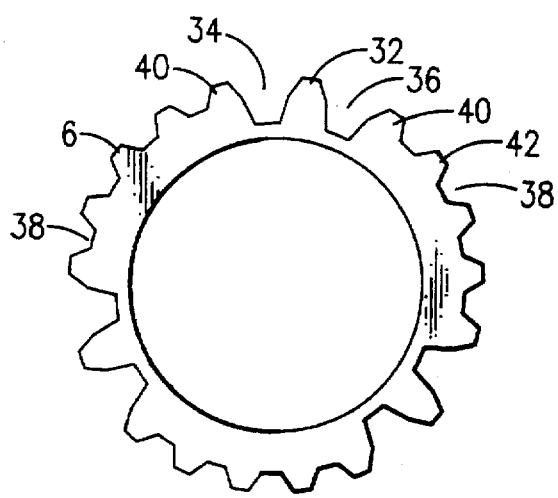

FIG. 4A shows a modified stop disc for supporting a gear wheel whereby it is made possible to spare one of said discs in relation to the above mentioned support. For said purpose, the stop disc 6 has a modified tooth geometry in which at least one tooth 32 is designed so as to have longer tooth flanks but not to enlarge the external diameter of the stop disc 6. This is obtained by the fact that the tooth gaps 34 and 36 adjacent the tooth 32 are cut deeper than the remaining tooth gaps. Only one tooth 32 is shown in FIG. 4. But three teeth 32 can advantageously be distributed on the periphery at equal angles (see FIG. 4B). The tooth gaps 34 and 36 are different not only in their depth but also in their width from the tooth gaps 38 of the other toothing. Thus, the spacing of the teeth 32 from the adjacent teeth 40 also does not correspond to the spacing from each other of two adjacent teeth 40 and 42. The tooth 32, on the contrary, is disposed so as to be offset, in a peripheral direction, relative to the other toothing by at least part of its width.

A disc thus shaped can no longer be inserted in the symmetrically designed internal toothing of a gear wheel 43. Therefore, the teeth 32, prior to being assembled in the gear wheel 43, are bent at least to the extent that the stop disc 6 can be pushed through the internal diameter of the internal toothing 8 of the gear wheel 43. As soon as the stop disc 6 is in the groove 30 of the gear wheel 43, the stop disc 6 is rotated in said groove 30 until the teeth 32 coincide with the tooth gap of the internal toothing 8 of the gear wheel 43. The teeth 32 of the stop disc 6 lie, in this position, in tooth gaps of the internal toothing 8 of the gear wheel 43 while with at least part of their width the other teeth 40 and 42 of the stop disc 6 coincide with the teeth of the internal toothing 8 of the gear wheel 43. An axial displacement of the gear wheel 43, relative to the stop disc 6, is now no longer possible. To prevent further rotation of the stop disc 6 in the groove of the gear wheel 43, the teeth 32 are bent to an extent such that upon rotation the external tooth flanks of the teeth 32 can come into contact with the internal tooth flanks of the tooth gaps in which they are.

Figure 5:
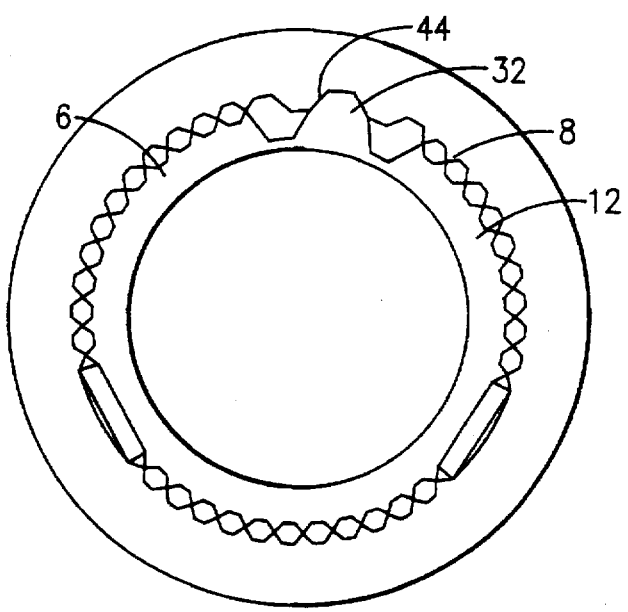
FIG. 5 is the assembled support according to FIG. 4.

FIG. 5 shows the assembled state of the gear wheel 43 and of the stop disc 6. Here, the teeth of the internal toothing 8 of the gear wheel 43 coincide in the rotated state of the stop disc 6 with the teeth of the external toothing 12 of the stop disc 6. The teeth 32 of the stop disc 6 lie in tooth gaps 44 of the gear wheel 43. The axial displacement of gear wheel 43 and stop disc 6, in relation to each other, is obtained by the teeth of the internal toothing 8 and the external toothing 12 while a further rotation of the stop disc 6 is prevented by the teeth 32.

Figure 6A:
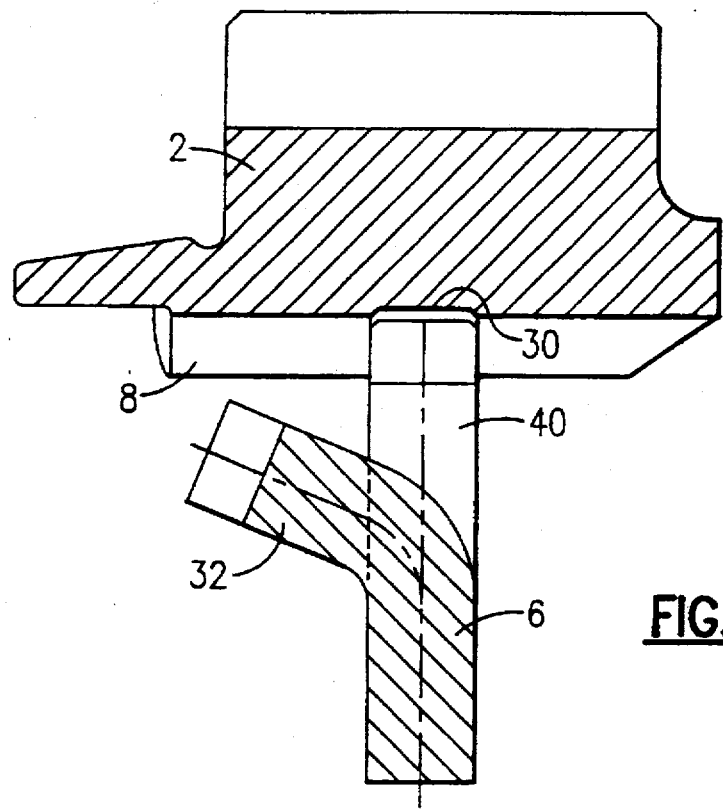
FIG. 6 is the diagrammatic representation of the meshing of teeth.

FIG. 6A shows the diagrammatic representation of a gear wheel 43 and of a stop disc 6 which is situated in a groove 30 of the gear wheel 43. Here the stop disc 6 has the assembled state with amply bent tooth 32 while the other teeth 40 and 42 lie in the groove 30.

Figure 6B:
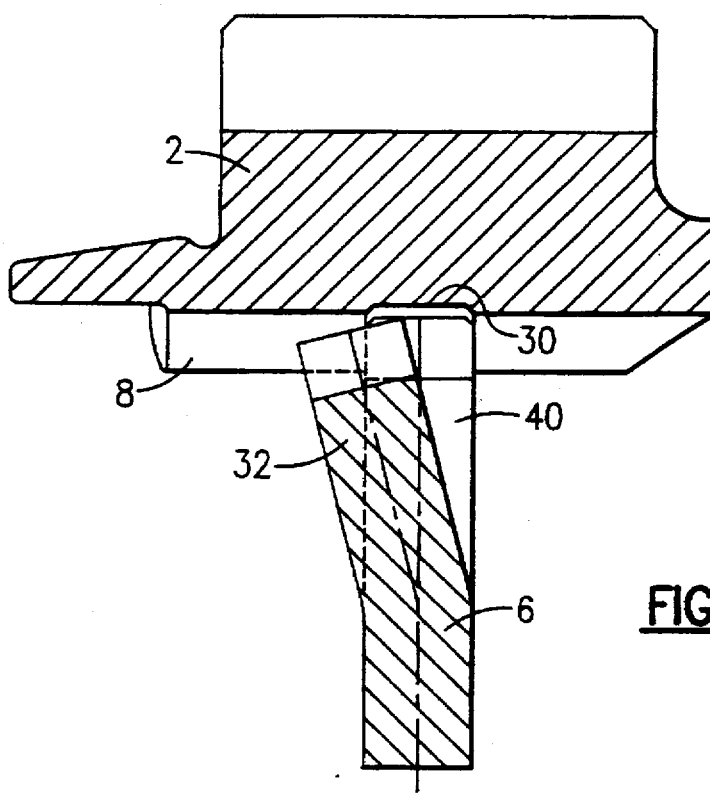

FIG. 6B shows the diagrammatic representation of a gear wheel 43 and of a stop disc 6 situated in a groove 30 of the gear wheel 43. The stop disc 6 has here a final state with reflexed tooth 32 while the other teeth 40 and 42 lie in the groove 30. The tooth 32 here overlaps with the internal toothing 8 of the gear wheel 43.

Reference numerals
4 gear wheel
6 stop disc
8 internal toothing
10 recess
12 external toothing
14 recess
16 locking disc
18 external toothing
20 area of the external periphery
22 locking device
24 shaft
28 structural part of the transmission
30 groove
32 tooth
34 tooth gap
36 tooth gap
38 tooth gap
40 tooth
42 tooth
43 gear wheel
44 tooth gap

We claim:

1. A gear support supporting a gear wheel having a plurality of internal teeth and a plurality of external teeth;

wherein said internal teeth (8) of said gear wheel (4) has at least one discontinuity provided therein;

said gear support comprises a first disc having a plurality of external teeth which correspond to said internal teeth (8) of said gear wheel (4), said first disc has at least one mating discontinuity formed in said plurality of external teeth which is located to coincide with said discontinuity of said internal teeth (8) of said gear wheel (4), said external teeth of said first disc are insertable through said internal teeth (8) of said gear wheel (4) into a groove (30) provided in said gear wheel (4), and said first disc is at least partially rotatable within said groove (30) whereby coincidence of said internal teeth (8) of said gear wheel (4) and said external teeth of said first disc and coincidence of said at least one discontinuity of said internal teeth (8) and said at least one mating discontinuity of said plurality of external teeth is obtainable; and a locking mechanism of said gear support cooperates with said discontinuities, once said discontinuities coincide with one another, to lock the coincident position of said gear wheel (4) relative to said first disc.

2. The gear support according to claim 1, wherein said at least one discontinuity in said internal teeth (8) of said gear wheel (4) is at least one recess (10);

said at least one mating discontinuity in the external teeth of said first disc (6) is at least one recess (14); and said locking mechanism comprises a second disc (16) which has an external toothing that corresponds to said internal toothing of said gear wheel (4) and said second disc (16) supports at least one locking tab (22), said external toothing of said second disc is insertable through said internal toothing of said gear wheel (4) into said groove and, once said teeth and said recesses of said first disc (6) and said gear wheel (4) are coincident with one another, said locking tab (22) is at least partially insertable into said recess (14) of said first disc (6) and said recess (10) of said gear wheel (4) to prevent relative rotation between said gear wheel (4) and said first disc (6).

3. The gear support according to claim 2, wherein both said first and said second discs have a central through bore by which said first and second discs are supported on a rotatable shaft to facilitate support of said gear wheel (4) on said shaft.

4. The gear support according to claim 2, wherein at least one securing device (28) cooperates with said first and second discs to prevent axial movement of said first and second discs against the direction of insertion of said first disc into said groove (30).

5. The gear support according to claim 1, wherein said at least one discontinuity in said internal teeth (8) of said gear wheel (4) is at least one tooth gap (44); and said at least one mating discontinuity in the external teeth (12) of the first disc (6) includes at least one tooth (32), located on the periphery of said first disc (6) and offset in a peripheral direction relative to said external teeth (40, 42), and, after said first disc is inserted through said internal teeth (8) of said gear wheel (4), said locking mechanism comprises moving a flank portion of said at least one tooth (32) into abutment against an internal flank portion of said tooth gap (44) to prevent relative rotation between said gear wheel (4) and said first disc (6).

6. The gear support according to claim 5, wherein said first disc has a central through bore by which said first disc (6) is supported on a rotatable shaft to facilitate support of said gear wheel (4) on said shaft.

7. The gear support according to claim 5 wherein at least one securing device (28) cooperates with said first disc to prevent axial movement of said first disc against the direction of insertion of said first disc into said groove (30).

* * * * *